US012372908B2

(12) United States Patent
Mase

(10) Patent No.: US 12,372,908 B2
(45) Date of Patent: Jul. 29, 2025

(54) IMAGE FORMING APPARATUS

(71) Applicant: Ryusuke Mase, Kanagawa (JP)

(72) Inventor: Ryusuke Mase, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/599,228

(22) Filed: Mar. 8, 2024

(65) Prior Publication Data

US 2024/0319647 A1 Sep. 26, 2024

(30) Foreign Application Priority Data

Mar. 22, 2023 (JP) ................................ 2023-045589
Oct. 10, 2023 (JP) ................................ 2023-175208

(51) Int. Cl.
*G03G 15/00* (2006.01)
*G03G 15/08* (2006.01)

(52) U.S. Cl.
CPC ..... *G03G 15/5008* (2013.01); *G03G 15/0893* (2013.01); *G03G 15/5045* (2013.01); *G03G 15/505* (2013.01)

(58) Field of Classification Search
CPC ....................................... G03G 15/0887–0893
See application file for complete search history.

(56) References Cited

U.S. PATENT DOCUMENTS 9,063,467 B2 * 6/2015 Suzuki .............. G03G 15/0877
2014/0301747 A1 10/2014 Takahashi et al.
2015/0370196 A1 12/2015 Ozaki et al.
2020/0117119 A1 4/2020 Mase et al.
2021/0041806 A1 2/2021 Tsuchiya et al.
2022/0397841 A1 12/2022 Tsuchiya et al.

FOREIGN PATENT DOCUMENTS

JP 2012-128143 A 7/2012
JP 2013-054106 A 3/2013
JP 2013-238836 A 11/2013
JP 2014-026157 A 2/2014
JP 2021-071552 A 5/2021

* cited by examiner

*Primary Examiner* — Leon W Rhodes, Jr.
(74) *Attorney, Agent, or Firm* — XSENSUS LLP

(57) ABSTRACT

An image forming apparatus includes an image bearer, a developing device, a motor, and circuitry. The developing device includes a screw and a developing roller. The screw stirs and conveys a developer. The developing roller bears the developer stirred and conveyed by the screw, brings the developer into contact with the image bearer, and develops an electrostatic latent image on the image bearer. The motor drives the developing device at multiple process speeds. The circuitry is configured to cause the motor to drive the screw and the developing roller before the developing roller starts developing the electrostatic latent image on the image bearer and adjust a drive time of the motor based on a process speed in a previous printing and a process speed in a next printing.

8 Claims, 5 Drawing Sheets

IMAGE FORMING APPARATUS

CROSS-REFERENCE TO RELATED APPLICATIONS

This patent application is based on and claims priority pursuant to 35 U.S.C. § 119(a) to Japanese Patent Application No. 2023-045589, filed on Mar. 22, 2023, and No. 2023-175208 filed on Oct. 10, 2023, in the Japan Patent Office, the entire disclosures of each are hereby incorporated by reference herein.

BACKGROUND

Technical Field

Embodiments of the present disclosure generally relate to an electrophotographic image forming apparatus, such as a copier, a printer, a facsimile machine, or a multifunction peripheral (MFP) having at least two of these functions.

Related Art

As known in the art, an image forming apparatuses such as a copier, a facsimile machine, and a printer includes a developing device using a dry developer. The developing device uses the dry developer to visualize an electrostatic latent image formed on an image bearer by an electrostatic recording method or an electrophotographic method. As the dry developer, a one-component developer using toner containing magnetic material and a two-component developer including toner and carrier are generally used.

A process speed (a rotational speed of the image bearer) is preferably optimized by a type of recording medium to be used, in order to prevent the occurrence of image defects. For this reason, the image forming apparatus known in the art switches the number of process speeds corresponding to the types of recording media.

On the other hand, the developing device is recently downsized. For example, a trickle development system supplies carrier with toner to the developer in the developing device and discharges excess developer from a discharge opening, which enables reducing the developer and the size of the developing device. The amount of the developer to be filled has been reduced to, for example, less than 350 g. In addition, increasing the process speed to increase productivity increases the circulation speed of the developer in the developing device.

SUMMARY

This specification describes an improved image forming apparatus that includes an image bearer, a developing device, a motor, and circuitry. The developing device includes a screw and a developing roller. The screw stirs and conveys a developer. The developing roller bears the developer stirred and conveyed by the screw, brings the developer into contact with the image bearer, and develops an electrostatic latent image on the image bearer. The motor drives the developing device at multiple process speeds. The circuitry is configured to cause the motor to drive the screw and the developing roller before the developing roller starts developing the electrostatic latent image on the image bearer and adjust a drive time of the motor before developing the electrostatic latent image based on a process speed in a previous printing and a process speed in a next printing.

This specification also describes an improved image forming apparatus that includes an image bearer, a developing device, a motor, and circuitry. The developing device includes a screw and a developing roller. The screw stirs and conveys the developer. The developing roller bears the developer stirred and conveyed by the screw, brings the developer into contact with the image bearer, and develops an electrostatic latent image on the image bearer. The motor drives the developing device at multiple process speeds. The circuitry is configured to cause the motor to drive the screw and the developing roller after the developing roller develops the electrostatic latent image on the image bearer and adjust a drive time of the motor after developing the electrostatic latent image based on a process speed in a previous printing and a process speed in a next printing.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1A:
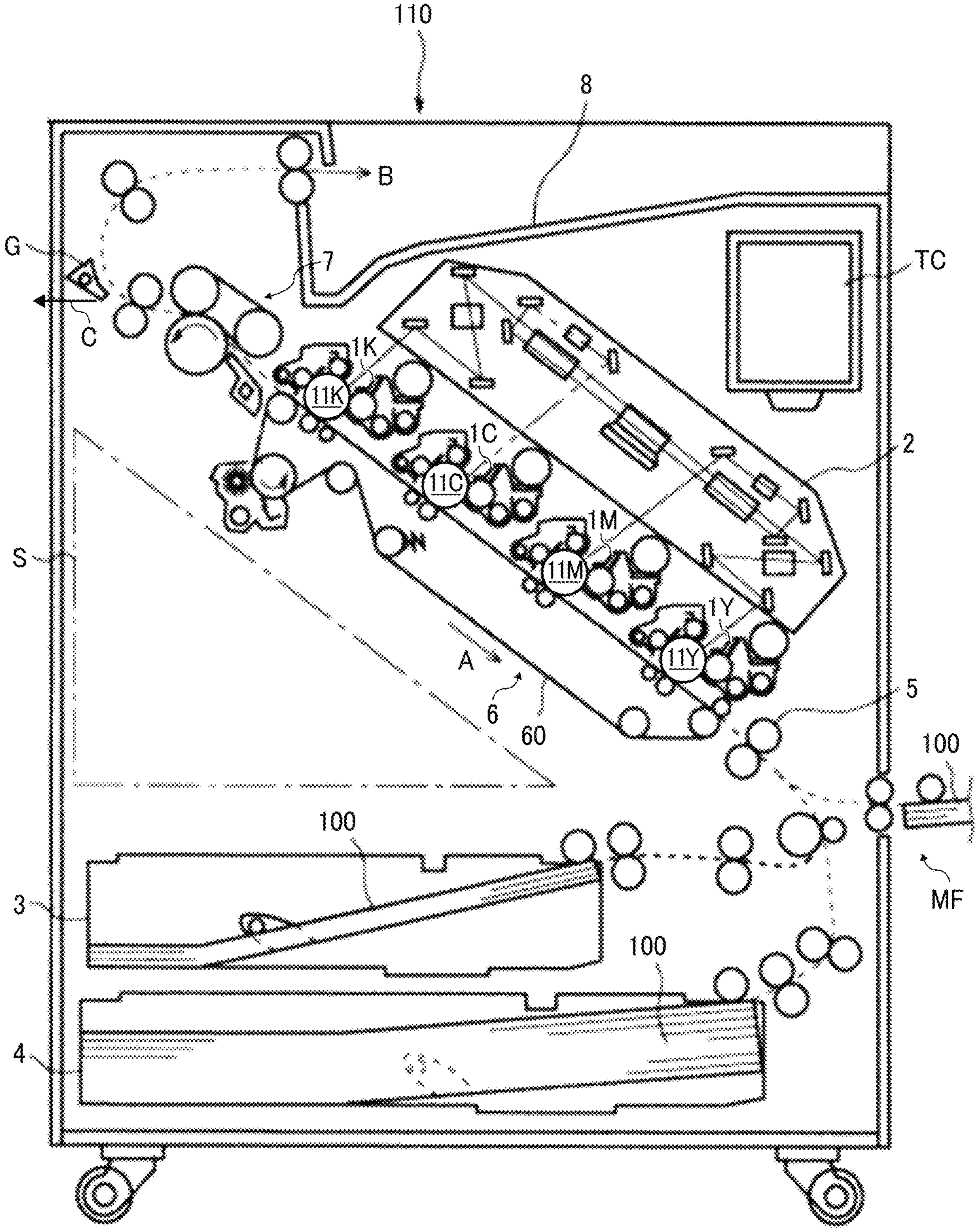
FIG. 1A is a schematic diagram illustrating a configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a," "an," and "the" are intended to include the plural forms as well, unless the context clearly indicates otherwise.

Embodiments of the present disclosure are described below in detail with reference to the drawings. Identical reference numerals are assigned to identical or equivalent components and a description of those components may be simplified or omitted.

The following describes a developing device, a process cartridge, and an image forming apparatus, according to embodiments of the present disclosure, with reference to the accompanying drawings. It is to be understood that those skilled in the art can easily modify and change the present disclosure within the scope of the appended claims to form other embodiments, and these modifications and changes are included in the scope of the appended claims. The following description is an example of the best mode of the present disclosure, and does not limit the scope of the claims.

The following describes a configuration of an image forming apparatus.

With reference to FIGS. 1A to 3, a color laser printer according to the present embodiment is described below. The color laser printer is an electrophotographic image forming apparatus employing a direct transfer system and is referred to as a laser printer. FIG. 1A is a schematic diagram illustrating a configuration of a laser printer that is an image forming apparatus 110 according to an embodiment of the present disclosure. FIG. 1B is a block diagram illustrating a hardware configuration of the image forming apparatus 110.

A transfer conveyance belt 60 rotates in a direction indicated by an arrow A in FIG. 1A, and the transfer conveyance belt 60 conveys a sheet 100.

The image forming apparatus 110 includes four process cartridges 1Y, 1M, 1C, and 1K arranged on the transfer conveyance belt in this order from upstream in a sheet conveyance direction in which the sheet 100 moves. Y, M, C, and K represent colors of yellow (Y), magenta (M), cyan (C), and black (K), respectively.

The process cartridges 1Y, 1M, 1C, and 1K include photoconductor drums 11Y, 11M, 11C, and 11K as image bearers and developing devices, respectively. The process cartridges 1Y, 1M, 1C, and 1K are arranged such that the rotation axes of the photoconductor drums are parallel to each other and are arranged at a predetermined pitch in the sheet conveyance direction.

The laser printer includes, in addition to the process cartridges 1Y, 1M, 1C, and 1K, an optical writing device 2, sheet trays 3 and 4, a registration roller pair 5, a transfer device 6, a fixing device 7, and an output tray 8. The transfer device 6 includes a belt driving device driving a transfer conveyance belt 60 as a sheet conveyor to convey the sheet 100 so as to pass through the transfer positions of the process cartridges. The fixing device 7 includes a fixing belt. In addition, the image forming apparatus 110 includes a bypass feeder MF and a toner supply container TC. The image forming apparatus 110 also includes a waste toner bottle, a sheet reversing device, and a power supply, which are disposed in a space S indicated by an alternate long and short dash line.

The optical writing device 2 as a latent image forming device includes a light source, a polygon mirror, an f-θ lens, and a reflection mirror. Based on image data, the optical writing device 2 irradiates and scans surfaces of the photoconductor drums 11Y, 11C, 11M, and 11K with laser light.

Dashed lines in FIG. 1A indicate conveyance paths of the sheet 100. The sheet 100 is fed from one of the sheet trays 3 and 4 and the bypass feeder MF, conveyed by conveyance rollers while being guided by conveyance guides, and is sent to a temporary stop position on the registration roller pair 5. The registration roller pair 5 sends the sheet 100 to the transfer conveyance belt 60 at a predetermined timing, and the transfer conveyance belt 60 conveys the sheet 100 to pass through transfer nips of the process cartridges 1Y, 1M, 1C, and 1K.

Toner images are developed on the photoconductor drums 11Y, 11M, 11C, and 11K in the process cartridges 1Y, 1M, 1C, and 1K, and transfer electric fields and pressures in transfer nips transfer the toner images to the sheet 100, respectively. As a result, the toner images are superimposed onto the sheet 100 to form a full color toner image. After the toner image is transferred from each of the photoconductor drums 11Y, 11M, 11C, and 11K to the sheet 100, a cleaner cleans the surface of each of the photoconductor drums 11Y, 11M, 11C, and 11K, and a discharging device initializes the surface potential of each of photoconductor drums 11Y, 11M, 11C, and 11K to be ready for the next formation of the electrostatic latent image.

On the other hand, the sheet 100 bearing the full color toner image is sent to the fixing device 7, and the fixing device 7 fixes the full color toner image onto the sheet 100. Subsequently, a switching guide pivots to have a posture to direct the sheet 100 in a first sheet ejection direction B or a second sheet ejection direction C. The sheet 100 directed in the first sheet ejection direction is ejected to the output tray 8 and stacked on the output tray 8 in a so-called face-down state in which the full color toner image is on the lower face of the sheet 100. On the other hand, the sheet 100 directed in the second sheet ejection direction Cis conveyed toward another post-processing apparatus such as a sorter or a binder, or conveyed again to the registration roller pair 5 for double-sided printing via a switchback portion.

Figure 1B:
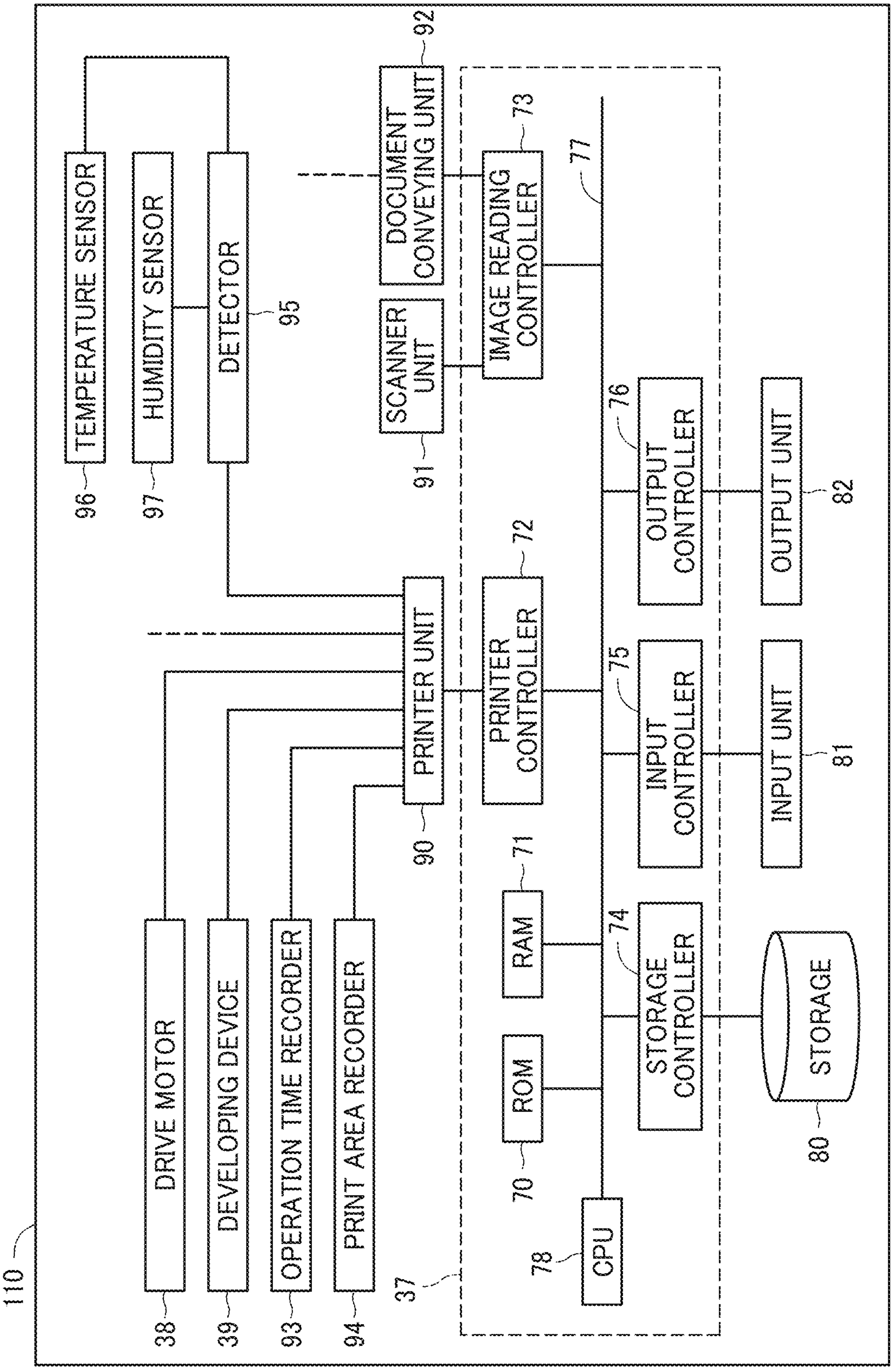
FIG. 1B is a block diagram illustrating a hardware configuration of the image forming apparatus according to the embodiment of the present disclosure.

The following describes a hardware configuration of the image forming apparatus 110 with reference to FIG. 1B that is a block diagram.

The image forming apparatus 110 includes a controller 37 as circuitry including a central processing unit (CPU) 78 as illustrated in FIG. 1B.

The controller 37 as the circuitry includes a read-only memory (ROM) 70, a random-access memory (RAM) 71, a printer controller 72, an image reading controller 73, a storage controller 74, an input controller 75, and an output controller 76. Parts in the controller 37 are connected to each other and connected to the CPU 78 via a bus 77.

The image forming apparatus 110 includes hardware such as a storage 80 (that is a memory), an input unit 81, an output unit 82, a printer unit 90, a scanner unit 91, and a document conveying unit 92. The printer unit 90 is connected to a drive motor 38, a developing device 39, an operation time recorder 93, a print area recorder 94, and a detector 95. The detector 95 is connected to a temperature sensor 96 and a humidity sensor 97. Each of the printer controller 72, the image reading controller 73, the storage controller 74, the input controller 75, and the output controller 76 in the controller 37 controls the hardware together with the CPU 78 and includes an interface to couple to the CPU 78.

The controller 37 including the CPU 78 performs an entire control of the image forming apparatus 110. The CPU 78 starts an operating system program (OS) using a boot program stored in the ROM 70. The CPU 78 executes a control program stored in the storage 80 or the ROM 70 on the OS.

The RAM 71 is used as a main memory or a temporary storage area, such as a work area of the CPU 78. The storage 80 is a readable and writable nonvolatile storage device such as a hard disk drive (HDD). The storage 80 stores programs, such as a program for controlling the entire image forming apparatus 110, various application programs, and various data, such as a video illustrating maintenance works and data to manage consumable items.

The CPU 78 accesses the storage via the storage controller. The CPU 78 reads the control program and the application program from the storage 80 or the ROM 70 and executes the program loaded in the RAM 71 to control the image forming apparatus 110. As described above, the hardware such as CPU 78, ROM 70, RAM 71, and the storage 80 in the controller 37 forms a so-called computer in the present disclosure.

In the image forming apparatus 110 according to the present embodiment, CPU 78 and the printer controller 72 execute steps illustrated in a flowchart of FIG. 5B described below using a program loaded in the memory such as the RAM 71. However, another system may be employed. For example, a plurality of processors, a RAM, a ROM, and a storage may be used in cooperation to execute each process illustrated in the flowchart described below. Alternatively, one CPU and one memory may be used to execute each process illustrated in the flowchart described below. A hardware circuit such as an application-specific integrated circuit (ASIC) or a field-programmable gate array (FPGA) may be used to execute a part of the processes.

The CPU 78 controls the image reading controller 73, and the image reading controller 73 controls the scanner unit 91 to read an image on a document and generate image data. The CPU 78 controls the printer controller 72, and the printer controller 72 controls the printer unit 90 to form an image on a sheet as a recording medium.

The input controller 75 is coupled to the input unit 81 and the controller 37 and receives an operation instruction of the user from the input unit 81 such as a touch panel or a button. The output controller 76 is coupled to the output unit 82 and the controller 37 and controls the output unit 82 including a display such as a liquid crystal display (LCD) or a cathode ray tube display (CRT) to display an operation screen or the video to the user.

In the present embodiment, the output unit 82 is described as the display that performs display outputting, but the output unit 82 may include a speaker that performs voice output in addition to display outputting. The input unit 81 may include a microphone for voice input in addition to the input using the touch panel or the button.

Figure 2:
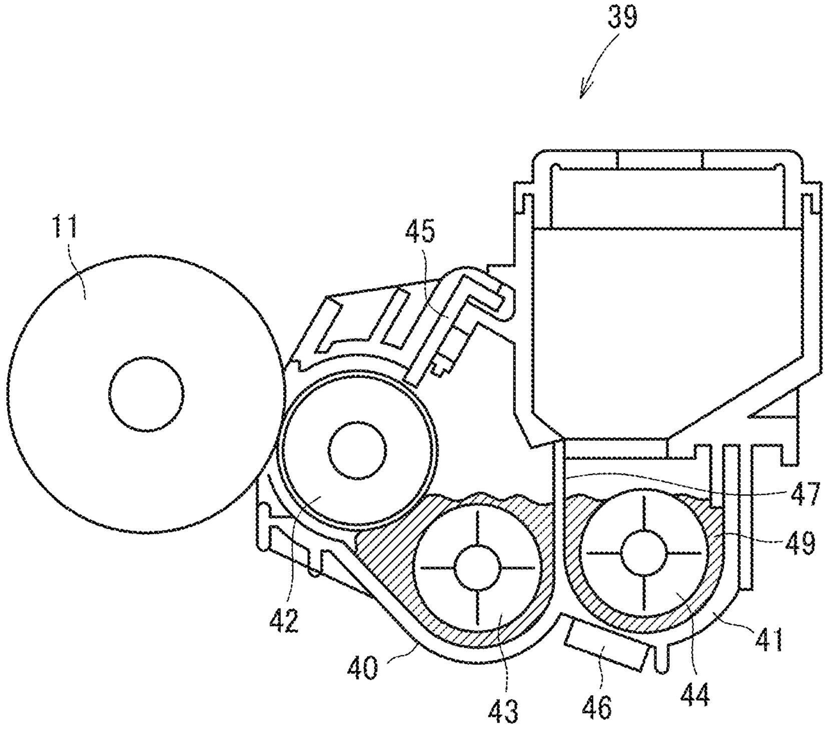
FIG. 2 is a schematic diagram illustrating a configuration of a developing device used in the image forming apparatus of FIGS. 1A and 1B.
Figure 3:
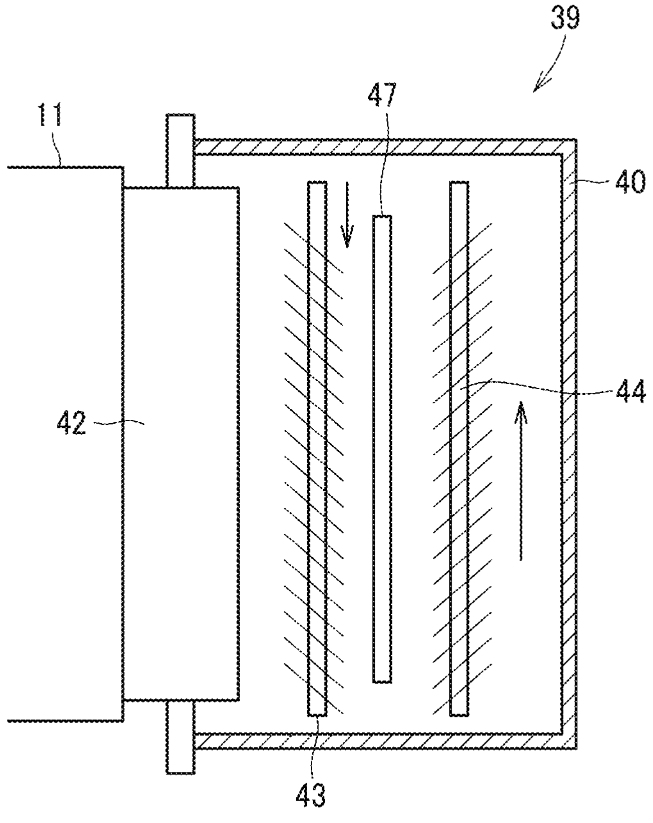
FIG. 3 is a schematic diagram illustrating a first conveying screw, a second conveying screw, and a partition wall in the developing device of FIG. 2.

With reference to FIGS. 2 and 3, the developing device 39 is described below.

The developing device 39 includes a developing roller 42 disposed so as to be partially exposed from an opening of a casing of the developing device 39. In addition, the developing device 39 includes a first conveying screw 43, a second conveying screw 44, a doctor blade 45, and a toner density sensor that is referred to as a T sensor 46. The first conveying screw 43 may be referred to as a first screw below, and the second conveying screw 44 may be referred to as a second screw below.

The casing accommodates two component developer 49 including magnetic carrier and negatively chargeable toner. The first conveying screw 43 and the second conveying screw 44 stir and convey the two component developer 49, which frictionally charges the two component developer, and the developing roller 42 bears the two component developer 49.

The doctor blade 45 adjusts the thickness of a layer of developer on the developing roller 42 that is rotated, Rotating the developing roller 42 conveys the developer having the adjusted layer thickness to a developing range facing the photoconductor 11. In the developing range, the developer on the developing roller contacts the electrostatic latent image on the photoconductor 11 as the image bearer, and the toner adheres to the electrostatic latent image on the photoconductor 11. As a result, a toner image is formed on the photoconductor 11. The two component developer in which the toner is consumed by the development is returned into the casing with the rotation of the developing roller 42.

A partition wall 47 is disposed between the first conveying screw 43 and the second conveying screw 44. The partition wall 47 separates the casing into a first supply portion 40 that houses the developing roller 42 and the first conveying screw 43 and a second supply portion 41 that houses the second conveying screw 44.

The developing roller 42, the first conveying screw 43, and the second conveying screw 44 are connected by a gear train and driven by the drive motor 38 as a driver. The developing roller 42, the first conveying screw 43, and the second conveying screw 44 rotate at rotational speeds having a constant ratio determined by a gear ratio of the gear train in directions determined by the gear train, respectively. The controller 37 controls the rotation of the drive motor 38 such as a start, a stop, and rotation speeds.

The drive motor 38 rotates the first conveying screw 43, and the first conveying screw supplies the two component developer in the first supply portion 40 to the developing roller 42 while conveying the two component developer from the back side to the front side in a direction perpendicular to the paper surface of which FIG. 2 is drawn. The two component developer conveyed to the vicinity of the end of the first supply portion 40 by the first conveying screw 43 enters the second supply portion 41 through an opening of the partition wall 47.

The drive motor 38 rotates the second conveying screw 44 in the second supply portion 41, and the second conveying screw 44 conveys the two component developer conveyed from the first supply portion 40 in a direction opposite to the direction in which the first conveying screw 43 conveys the two component developer. The two component developer conveyed to the vicinity of the end of the second supply portion 41 by the second conveying screw 44 returns the first supply portion 40 through another opening of the partition wall 47.

The T sensor 46 including a magnetic permeability sensor is disposed on the center of the bottom wall of the second supply portion 41 and outputs a voltage having a value corresponding to the magnetic permeability of the two component developer passing over the T sensor 46. Since the magnetic permeability of the two component developer has a certain degree of correlation with the toner density, the T sensor 46 outputs a voltage corresponding to the toner density.

The value of the outputted voltage is sent to the controller 37 illustrated in FIG. 5A, which will be described later. The controller 37 includes the RAM 71 that stores a target value Vtref of the voltage outputted from the T sensor 46.

The RAM 71 also stores data of target values Vtref of the output voltages from T sensors mounted on other developing devices. The controller 37 uses the target value Vtref to control driving a toner supply device. Specifically, the controller 37 controls driving the toner supply device to supply the toner into the second supply portion 41 so that the value of the output voltage from the T sensor 46 approaches the target value Vtref.

Supplying the toner maintains the toner density of the two component developer in the developing device 39 within a predetermined range. The controller 37 performs the same toner supply control for the developing devices in the other process cartridges.

Variation in a height of a developer face in the first supply portion 40 is described below.

Figure 4:
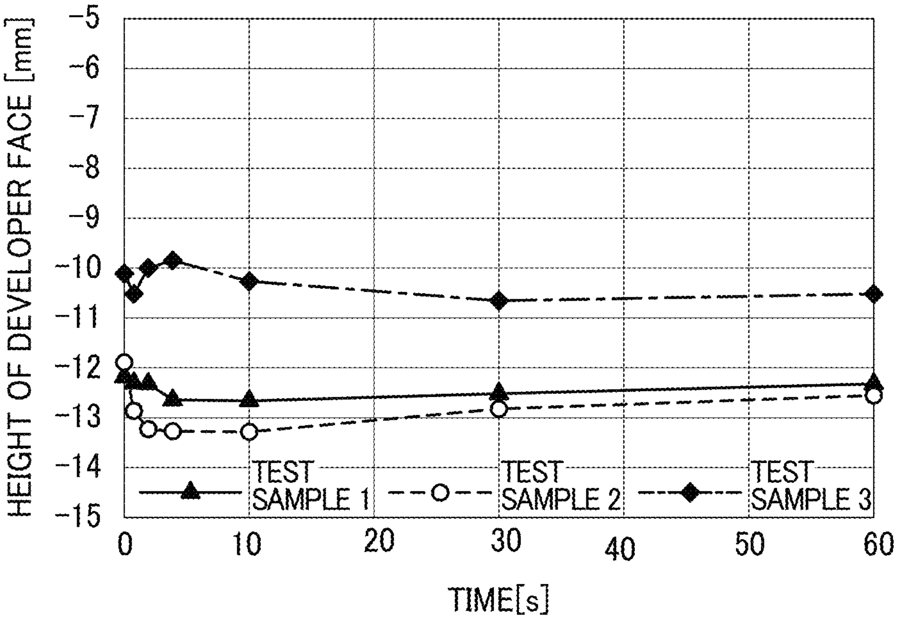
FIG. 4 is a graph illustrating variations of heights of developer faces in three test samples caused by changing a process speed.

FIG. 4 is a graph illustrating variations of heights of developer faces in the first supply portion caused by changing a process speed from a regular speed to a low speed. In the first supply portion 40, the first conveying screw 43 is disposed. FIG. 4 illustrates variations in three test samples 1, 2, and 3 drawn by an alternate long and short dash line, a solid line, and a dashed line in order from the top. The heights of the developer faces at 0 see that are plotted at the left end of FIG. 4 were measured immediately after the process speed (in other words, a sheet conveyance speed) was changed from the regular speed to the low speed.

In all of the three test samples, the heights of developer faces temporarily decrease after the process speed (the sheet conveyance speed) is changed (in about 10 seconds after the process speed is changed). In the top two lines that are the alternate long and short dash line and the solid line, the heights of developer faces decrease about 1 mm, but the height of developer face in the bottom line that is the dashed line decrease about 1.5 mm.

Decreasing the height of developer face prevents the developing roller from scooping a sufficient amount of developer, which may cause an abnormal image such as white spots in an image or an image density fluctuation. To countermeasure the above-described disadvantage, the controller in the present embodiment performs a leveling operation until the height of developer face is stabilized before the image is outputted after the sheet conveyance speed is switched.

During the leveling operation, the controller 37 does not perform the toner supply control. The toner is not supplied to the developer in the developing device. The above-described control can maintain an appropriate developer balance and eliminate the shortage of the amount of the developer scooped up to the developing roller. As a result, the occurrence of the abnormal image is prevented.

The timing of performing the leveling operation may be before or after printing. In the developing device that is not the trickle development system and the developing device that is driven by two or more process speeds, the above-described structure according to the present embodiment can maintain the appropriate developer balance and eliminate the shortage of the amount of the developer scooped up to the developing roller. As a result, the occurrence of the abnormal image is prevented.

In the control performing the leveling operation immediately after printing, the process speed in the next printing is not determined. In this case, the controller 37 may temporarily set the regular speed as the process speed in the next printing and may perform the leveling operation. Alternatively, the controller 37 in the image forming apparatus 110 may record process speeds in printing operations in the past, determine and set the process speed having the highest possibility (high use frequency) as the process speed in the next printing, and perform the leveling operation immediately after printing.

Table 1 below indicates times of the leveling operations when the process speed is switched from one process speed to the other process speed in the first embodiment.

TABLE 1

| LEVELING OPERATION TIME (sec) | | PROCESS SPEED IN PREVIOUS PRINTING: REGULAR SPEED | MEDIUM SPEED | LOW SPEED |
|---|---|---|---|---|
| PROCESS SPEED IN CURRENT PRINTING | REGULAR SPEED | — | 2 | 5 |
| | MEDIUM SPEED | 1 | — | 2 |
| | LOW SPEED | 3 | 1 | — |

The time needed for the height of developer face in the first supply portion to stabilize was about 50 seconds in the three test samples in FIG. 4, but the present inventor found that this stabilization time differs depending on the process speed in the previous printing and the process speed in the current printing (or in a next printing). For this reason, the controller in the present embodiment changes the leveling operation time (that is a stirring time) based on the process speed in the previous printing and the process speed in the current printing (or in the next printing) as indicated by Table 1. Changing the leveling operation time that is the stirring time as described above minimizes a print standby time and stress on the developer due to stirring.

The present inventor performed experiments and found that the height of developer face in the first supply portion is influenced not only by the difference in the process speed but also by an environment around the developing device 39 in the image forming apparatus 110, the number of printed sheets, an operation time, and printed image areas on the printed sheets based on results of the experiments. In other words, the environment (temperature and humidity) and the number of printed sheets affect the fluidity of the developer, and therefore, the height of developer face in the first supply portion changes.

Specifically, a small toner concentration of the developer, a small charge amount of the toner T under a high-temperature and high-humidity environment, or a large number of rotations of the developing roller 42, the first conveying screw 43, and the second conveying screw 44 in the image forming apparatus having a high process speed increase the bulk density of the developer, which reduces the height of developer face in the first supply portion.

In contrast, a large toner concentration of the developer, a large charge amount of the toner T under a low-temperature and low-humidity environment, or a small number of rotations of the developing roller 42, the first conveying screw 43, and the second conveying screw 44 in the image forming apparatus having a low process speed decrease the bulk density of the developer, which increases the height of developer face in the first supply portion.

To countermeasure the above-described phenomena, the image forming apparatus may include the temperature sensor 96, the humidity sensor 97, the operation time recorder 93, and the print area recorder 94 as illustrated in FIG. 1B. The temperature sensor 96 and the humidity sensor 97 detect the temperature and humidity of the environment around the developing device 39. The operation time recorder 93 records a time while the drive motor 38 drives the developing device 39 after a new developer is set in the developing device or after a new developing device is set in the image forming apparatus. The print area recorder 94 records the sum of image areas of images developed by the developing device 39. Based on results detected by the temperature sensor 96 and the humidity sensor 97 and records recorded by the operation time recorder 93 and the print area recorder 94, the controller further adjusts the leveling operation time in the developing device 39 driven by the drive motor 38. Adjusting the leveling operation time that is the stirring time in Table 1 based on the environment (temperature and humidity) around the developing device and the number of printed sheets further optimizes the height of developer face in the first supply portion.

Figure 5A:
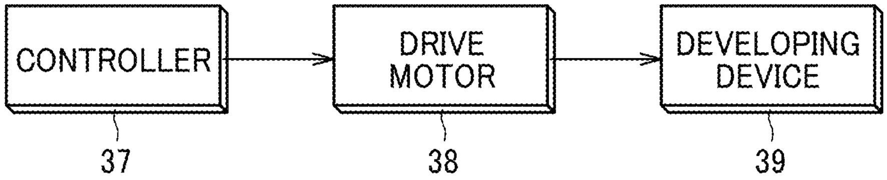
FIG. 5A is a block diagram of a controller and a drive motor to drive the developing device of FIG. 3.

FIG. 5A is a block diagram illustrating the developing device 39, the drive motor 38 to drive the developing device 39, and the controller 37 to control the drive motor 38. FIG.

5B is a flowchart of a control performed by the controller 37 to execute the leveling operation for the time in Table 1 described above.

Figure 5B:
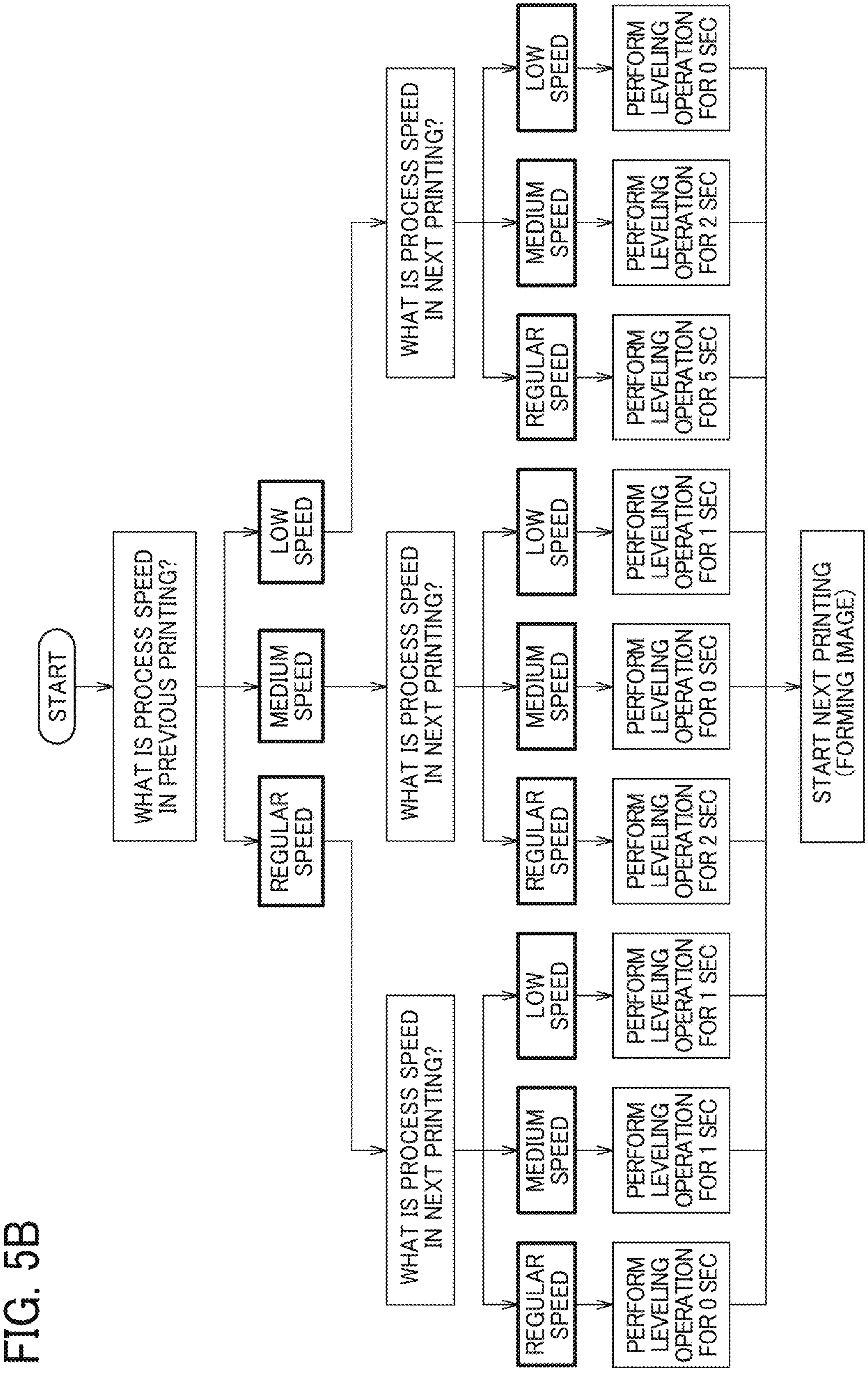
FIG. 5B is a flowchart of a control to control the drive motor of FIG. 5A driving the developing device of FIG. 3.

As illustrated in FIG. 5B, the controller 37 in the present embodiment adjusts the leveling operation time that is the stirring time, that is, the driving time of the drive motor based on the process speed in the previous printing (that is one of the regular speed, a medium speed, and the low speed) and the process speed in the current (next) printing (that is also one of the regular speed, a medium speed, and the low speed). The first conveying screw 43 and the second conveying screw 44 illustrated in FIG. 3 rotate for one of different leveling operation times that are stirring times determined based on the process speed in the previous printing and the process speed in the current printing (or in the next printing).

Rotating the first conveying screw 43 and the second conveying screw 44 as described above before the start of the current (next) printing (in other words, the current (next) image forming) can stabilize the height of developer face in the first supply portion. As a result, the above-described configuration can prevent the occurrence of the abnormal image having an abnormal high image density part or an abnormal low image density part in the toner image.

The present disclosure has been described above on the basis of the embodiments, but the present disclosure is not limited to the embodiments. Needless to say, various alterations can be made in the scope of the technical idea described in the scope of the claims. For example, the controller in the present embodiment selects the optimum leveling time based on the three process speeds that are the regular speed, the medium speed, and the low speed as illustrated in Table 1 and FIG. 5B, but the process speeds may be at least two process speeds that are the regular speed and the low speed, or may be four process speeds. Based on the four process speeds, the controller can select the optimum leveling time.

The following describes preferred aspects of the present disclosure.

First Aspect

In a first aspect, an image forming apparatus includes a screw and a developing roller. The screw stirs and conveys a developer. The developing roller bears the developer stirred and conveyed by the screw, brings the developer into contact with the image bearer, and develops an electrostatic latent image on the image bearer. The motor drives the developing device at multiple process speeds. The circuitry is configured to cause the motor to drive the screw and the developing roller before the developing roller starts developing the electrostatic latent image on the image bearer and adjust a drive time of the motor before developing the electrostatic latent image based on a process speed in a previous printing and a process speed in a current (next) printing.

Second Aspect

In a second aspect, an image forming apparatus includes an image bearer, a developing device, a motor, and circuitry. The developing device includes a developer, a screw, and a developing roller. The screw stirs and conveys the developer. The developing roller bears the developer stirred and conveyed by the screw, brings the developer into contact with the image bearer, and develops an electrostatic latent image on the image bearer. The motor drives the developing device at multiple process speeds. The circuitry is configured to cause the motor to drive the screw and the developing roller after the developing roller develops the electrostatic latent image on the image bearer and adjust a drive time of the motor after developing the electrostatic latent image based on a process speed in a previous printing and a process speed in a current (next) printing.

Third Aspect

In a third aspect, the image forming apparatus according to the first aspect or the second aspect includes a temperature sensor to detect temperature and a humidity sensor to detect humidity, and the circuitry is further configured to adjust the drive time based on the temperature detected by the temperature sensor and the humidity detected by the humidity sensor.

Fourth Aspect

In a fourth aspect, the image forming apparatus according to any one of the first to third aspects includes an operation time recorder to record an operation time for the motor to drive the developing roller, and the circuitry is further configured to adjust the drive time based on the operation time recorded by the operation time recorder.

Fifth Aspect

In a fifth aspect, the image forming apparatus according to any one of the first to fourth aspects includes a print area recorder to record a sum of an image area developed by the developing device, and the circuitry is further configured to adjust the drive time based on the sum of the image area recorded by the print area recorder.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An image forming apparatus comprising:

an image bearer;

a developing device including:

a screw to stir and convey a developer; and a developing roller to:

bear the developer stirred and conveyed by the screw;

bring the developer into contact with the image bearer; and develop an electrostatic latent image on the image bearer;

a motor to drive the developing device at multiple process speeds; and circuitry configured to:

cause the motor to drive the screw and the developing roller before the developing roller starts developing the electrostatic latent image on the image bearer; and adjust a drive time of the motor before developing the electrostatic latent image based on a process speed in a previous printing and a process speed in a next printing.

2. The image forming apparatus according to claim 1, further comprising:

a temperature sensor to detect temperature; and a humidity sensor to detect humidity, wherein the circuitry is further configured to adjust the drive time based on the temperature detected by the temperature sensor and the humidity detected by the humidity sensor.

3. The image forming apparatus according to claim 1, further comprising an operation time recorder to record an operation time for the motor to drive the developing device, wherein the circuitry is further configured to adjust the drive time based on the operation time recorded by the operation time recorder.

4. The image forming apparatus according to claim 1, further comprising a print area recorder to record a sum of an image area developed by the developing device, wherein the circuitry is further configured to adjust the drive time based on the sum of the image area recorded by the print area recorder.

5. An image forming apparatus comprising:

an image bearer;

a developing device including:

a screw to stir and convey a developer; and a developing roller to:

bear the developer stirred and conveyed by the screw;

bring the developer into contact with the image bearer; and develop an electrostatic latent image on the image bearer;

a motor to drive the developing device at multiple process speeds; and circuitry configured to:

cause the motor to drive the screw and the developing roller after the developing roller develops the electrostatic latent image on the image bearer; and adjust a drive time of the motor after developing the electrostatic latent image based on a process speed in a previous printing and a process speed in a next printing.

6. The image forming apparatus according to claim 5, further comprising:

a temperature sensor to detect temperature; and a humidity sensor to detect humidity, wherein the circuitry is further configured to adjust the drive time operation based on the temperature detected by the temperature sensor and the humidity detected by the humidity sensor.

7. The image forming apparatus according to claim 5, further comprising an operation time recorder to record an operation time for the motor to drive the developing device, wherein the circuitry is further configured to adjust the drive time based on the operation time recorded by the operation time recorder.

8. The image forming apparatus according to claim 5, further comprising a print area recorder to record a sum of an image area developed by the developing device, wherein the circuitry is further configured to adjust the drive time based on the sum of the image area recorded by the print area recorder.

* * * * *